(12) United States Patent
Sasada

(10) Patent No.: US 7,030,936 B2
(45) Date of Patent: Apr. 18, 2006

(54) PEDESTAL LEVEL CONTROL CIRCUIT AND METHOD FOR CONTROLLING PEDESTAL LEVEL

(75) Inventor: Masahiko Sasada, Kyoto (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 665 days.

(21) Appl. No.: 10/184,952

(22) Filed: Jul. 1, 2002

(65) Prior Publication Data
US 2003/0001976 A1    Jan. 2, 2003

(30) Foreign Application Priority Data
Jul. 2, 2001    (JP) .............................. 2001-200539

(51) Int. Cl.
H04N 5/16    (2006.01)
H04N 5/18    (2006.01)
H04N 5/57    (2006.01)

(52) U.S. Cl. ................. 348/691; 348/689; 348/687

(58) Field of Classification Search ................ 348/691, 348/673, 687, 689, 690, 257, 692; H04N 5/14, H04N 5/16, 5/18, 5/57
See application file for complete search history.

(56) References Cited

U.S. PATENT DOCUMENTS

| 4,494,137 A | 1/1985 | Freyberger et al. |
| 5,296,929 A | 3/1994 | Morimoto |
| 5,587,746 A | 12/1996 | Nakakuki |
| 5,995,166 A | 11/1999 | Kawano |

FOREIGN PATENT DOCUMENTS

| EP | 0 637 010 A1 | 2/1995 |
| JP | 58-083488 | 5/1983 |
| JP | 01-248783 | 10/1989 |
| JP | 05-300404 | 11/1993 |
| JP | 06-030299 | 2/1994 |
| JP | 10-191379 | 7/1998 |
| JP | 11-313268 | 11/1999 |

*Primary Examiner*—Sherrie Hsia
(74) *Attorney, Agent, or Firm*—McDermott Will & Emery LLP

(57) ABSTRACT

In order to reduce a circuit scale such as a brightness adjustment circuit or the number of pins in an IC chip, in the brightness adjustment circuit, a brightness adjusted video signal (internal video signal) output from an analog signal synthesis circuit or a D/A converter is input to one input terminal of a switch and a sample/hold circuit. The sample/hold circuit holds a voltage of a level in accordance with the pedestal level of the internal video signal at a timing in accordance with a sampling pulse in synchronization with the internal video signal. A clamp circuit clamps the pedestal level of an external video signal in accordance with a clamp pulse, using the voltage held by the sample/hold circuit as the reference voltage, and input it to the other input terminal. The output terminal of the switch is connected to an amplifier.

9 Claims, 9 Drawing Sheets

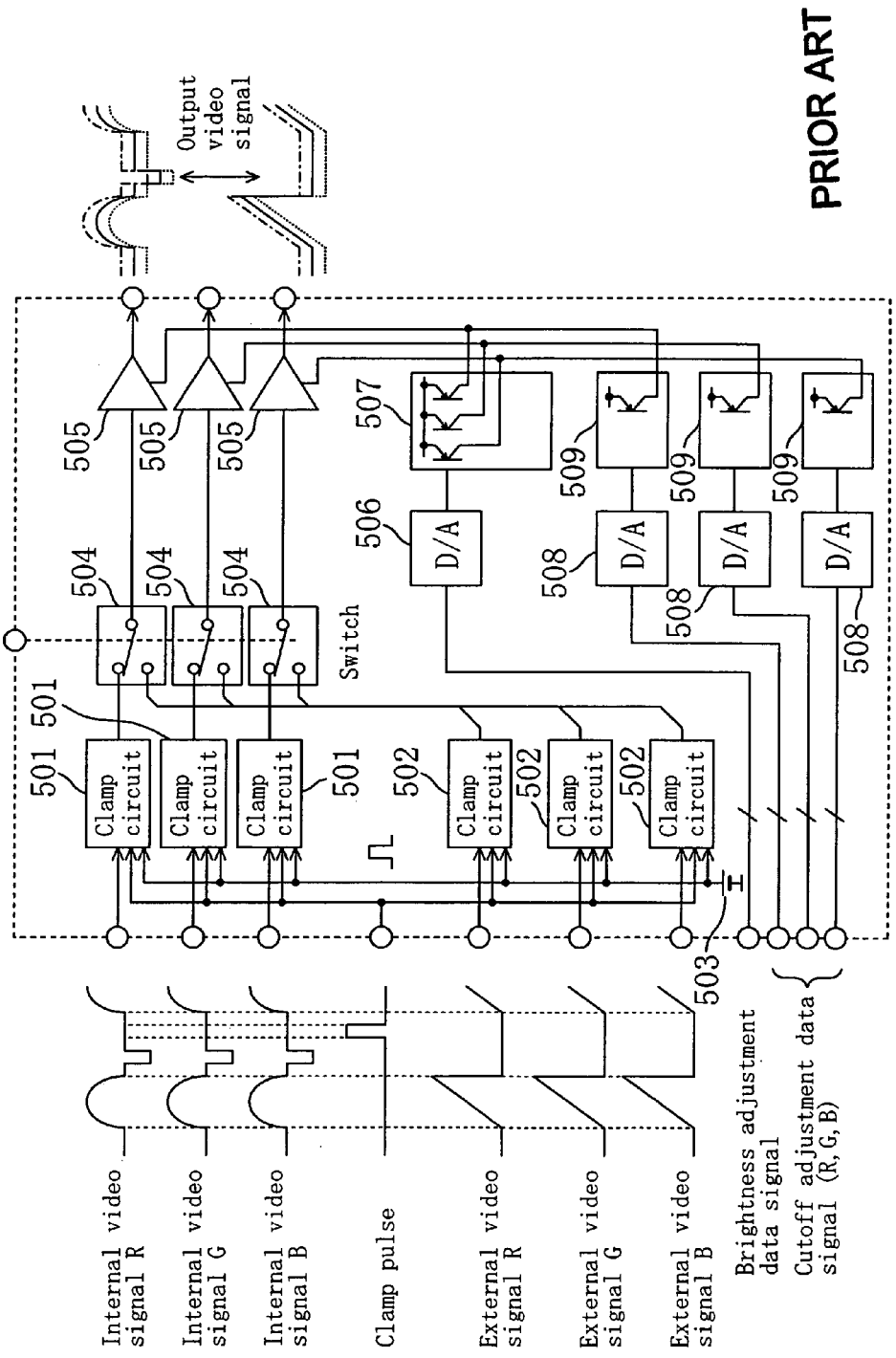

PEDESTAL LEVEL CONTROL CIRCUIT AND METHOD FOR CONTROLLING PEDESTAL LEVEL

BACKGROUND OF THE INVENTION

The present invention relates to a technology in pedestal level control circuits for video signal processing in a television receiver, etc., more precisely, for pedestal level adjustment, such as brightness adjustment, cutoff adjustment for adjusting white balance of color video images.

In a conventional television receiver, the pedestal level of a video signal output from a tuner or the like is not always constant. Therefore, for brightness adjustment, the pedestal level is clamped to a predetermined level and then is offset by a predetermined amount.

Furthermore, when a plurality of video signals are switched for use, for example, when an external video signal is input from external equipment, the adjustment as described above is performed with respect to these video signals to equalize the pedestal levels between them.

For display of color video images, cutoff adjustment in which the pedestal level is adjusted in the above-described manner for video signals of each of, for example, R, G, and B (red, green, and blue) is performed in order to adjust white balance in accordance with non-uniformity in the emission of a cathode ray tube (CRT).

Hereinafter, a conventional pedestal level control circuit for performing the above-described brightness adjustment or cutoff adjustment will be described more specifically.

FIG. 9 is a block diagram showing a conventional pedestal level control circuit (brightness adjustment circuit) for adjusting brightness of both internal and external video signals. In FIG. 9, a clamp circuit 501 fixes the pedestal level of an internal video signal while being input from, for example, a tuner, to a predetermined level. A clamp circuit 502 fixes the pedestal level of an external video signal while being input from external equipment, to the same level as the internal video signal. A reference voltage source 503 sets the predetermined pedestal level. A switch 504 selects internal video signals or external video signals. An amplifier 505 amplifies an input video signal, and converts, through a load resistor 505b, a current while being output from a transistor 505a into a voltage that the amplifier 505 outputs. A D/A converter 506 converts a digital adjustment data signal that is for brightness adjustment into an analog voltage signal. A brightness adjustment current output circuit 507 converts the analog voltage signal to a current signal and supplies it to the amplifier 505 so that the pedestal level of the video signal output from the amplifier 505 is set to a level in accordance with the brightness adjustment data.

In the pedestal level control circuit having the above-described configuration, the clamp circuit 501 and the clamp circuit 502 both use the same reference voltage source 503, so that the pedestal levels of the internal and external video signals are clamped to the same level to eliminate fluctuations in the pedestal level. Moreover, the brightness adjustment is performed by offsetting the pedestal level in accordance with the brightness adjustment data, based on the pedestal levels of the same level, so that there is no difference in the basic luminance of video images to be displayed, regardless of which the switch 504 is directed to.

FIG. 10 shows another conventional pedestal level control circuit (brightness and cutoff adjustment circuit) which has a configuration for performing brightness adjustment and cutoff adjustment with respect to internal and external video signals of three channels of RGB. In FIG. 10, both the reference voltage source 503 and the D/A converter 506 are the same as those shown in FIG. 9. The clamp circuit 501, the clamp circuit 502, the switch 504, and the amplifier 505, each being respectively the same as in FIG. 9 are provided for each of the R, G, and B video-signal channels. However, in addition to a signal current for brightness adjustment, respective signal currents for cutoff adjustment are input to each amplifier 505. The brightness adjustment current output circuit 507 outputs the signal current for brightness adjustment to the amplifiers 505 for R, G and B. Furthermore, a D/A converter 508 and a cutoff adjustment current output circuit 509 are provided. The D/A converter 508 converts a digital data signal for cutoff adjustment for each of R, G, and B to an analog voltage signal, and the cutoff adjustment current output circuit 509 converts the analog voltage signal to a current signal and supplies it to the amplifier 505 so that the pedestal level of the video signal output from each amplifier 505 is set to a level in accordance with the brightness adjustment data and the cutoff adjustment data.

In the pedestal level control circuit having the above-described configuration, as in the circuit shown in FIG. 9, the pedestal levels for all the R, G, and B and the internal and external video signals are clamped to the same level. Therefore, regarding brightness adjustment, the pedestal levels are offset by an amount in accordance with the brightness adjustment data for all the cases. On the other hand, regarding the cutoff adjustment, the pedestal level is offset by an amount in accordance with the cutoff adjustment data of each corresponding color. Therefore, there is no difference in the luminance of video images to be displayed, regardless of the switching of the switch 504 either to an internal video signal or an external video signal, and white balance suitable for non-uniformity in the emission of a CRT or the like can be obtained.

However, in the conventional pedestal level control circuits, the clamp circuit is provided for each video signal, so that the circuit scale tends to be large. Furthermore, it is necessary to perform brightness adjustment or cutoff adjustment after clamping the video signal. Therefore, for example, configuring elements or blocks subsequent to the clamp circuit in one IC chip requires input terminals (pins) to which the brightness adjustment signal or the like are input; digital input interfaces; power source circuits and power source terminals of two types for digital and analog signals; and lines between the IC chips (bus lines) or the like. Moreover, in a case in which the brightness adjustment or the like is performed based on digital signal processing and the D/A converter or the like is provided in the vicinity of the clamp circuit or the like, video signals are more susceptible to noise caused by the digital signals.

SUMMARY OF THE INVENTION

Therefore, with the foregoing in mind, it is an object of the present invention to facilitate a reduction of a circuit scale and to reduce the number of the pins of the IC chip and the number of lines between the IC chips.

A first pedestal level control circuit of the present invention includes a video data signal output means for outputting a digital video data signal; a pedestal level adjustment data signal output means for outputting a pedestal level adjustment data signal used to generate an analog video signal having a predetermined pedestal level; and a video signal generating means for generating the analog video signal having the predetermined pedestal level based on the video data signal and the pedestal level adjustment data signal.

In one preferable embodiment of the first pedestal level control circuit, the video signal generating means includes a first D/A converting means for converting the video data signal output from the video data signal output means into an analog signal; a second D/A converting means for converting the pedestal level adjustment data signal output from the pedestal level adjustment data signal output means into an analog signal; and an analog signal synthesis means for generating the analog video signal having a predetermined pedestal level by synthesizing the analog signals converted by the first D/A converter and the second D/A converter.

In one preferable embodiment of the first pedestal level control circuit, the video signal generating means includes a digital signal synthesis means for synthesizing the video data signal and the pedestal level adjustment data signal; and a D/A converting means for converting a digital signal synthesized by the digital signal synthesis means to an analog signal to generate the analog video signal having a predetermined pedestal level.

In one preferable embodiment of the first pedestal level control circuit, the pedestal level adjustment data signal is a brightness adjustment data signal for adjusting a luminance of video images.

The pedestal level is adjustable for, for example, brightness adjustment, without a clamp circuit being used, by generating, as described above, an analog video signal having a predetermined pedestal level in the step where signals are digital or in the step where the digital signals are D/A converted.

In one preferable embodiment of the first pedestal level control circuit, a plurality of sets are provided, each including the video data signal output means, the pedestal level adjustment data signal output means and the video signal generating means.

In one preferable embodiment of the first pedestal level control circuit, three sets are provided, each including the video data signal output means, the pedestal level adjustment data signal output means and the video signal generating means, the three sets corresponding to video images of red, green and blue, respectively.

In one preferable embodiment of the first pedestal level control circuit, the pedestal level adjustment data signal is a brightness and cutoff adjustment data signal both for performing brightness adjustment commonly to the video images of the three colors, and for performing cutoff adjustment for video images independently for each color.

Also the above preferable embodiments allow brightness adjustment or cutoff adjustment to be performed without a clamp circuit being used.

According to another aspect of the present invention, a second pedestal level control circuit includes a holding means for holding a predetermined pedestal level of a first video signal; a clamping means for clamping a second video signal such that a pedestal level of the second video signal is equal to the pedestal level of the first video signal that is held; and a switching means for selectively switching the first video signal and the clamped second video signal to output the signal.

With this embodiment, the pedestal level of the second video signal can be adjusted without a control signal such as a pedestal level adjustment signal. Furthermore, the pedestal level of the first video signal can be held, so that even if the first and the second video signals are asynchronous, the pedestal level can be adjusted by clamping the second video signal.

In one preferable embodiment of the second pedestal level control circuit, the first video signal having a predetermined pedestal level is an analog video signal having a predetermined pedestal level that is generated based on a digital video data signal and a pedestal level adjustment data signal.

Thus, the first video signal having a predetermined pedestal level can be obtained easily, and the pedestal level of the second video signal can be adjusted.

In one preferable embodiment of the second pedestal level control circuit, the video signal generating means outputs an analog signal based on the pedestal level adjustment data signal when the second video signal is selected.

Thus, the analog signal output from the video signal generating means becomes a signal having a constant level in accordance with the pedestal level adjustment data signal, so that even if the first and the second video signals are asynchronous, the pedestal level of the first video signal can be held, and also the second video signal can be clamped at a timing in accordance with the second video signal.

In one preferable embodiment of the second pedestal level control circuit, a plurality of sets are provided, each set including the holding means, the clamping means, and the switching means.

In one preferable embodiment of the second pedestal level control circuit, three sets are provided, each including the holding means, the clamping means, and the switching means, the three sets corresponding to video images of red, green and blue, respectively.

Thus, cutoff adjustment can be performed without equalizing the pedestal levels of the second video signals.

In one preferable embodiment of the second pedestal level control circuit, a plurality of sets are provided, each including the clamping means and the switching means, and the clamping means performs a clamping operation based on a pedestal level held by one holding means.

In one preferable embodiment of the second pedestal level control circuit, three sets are provided, each including the clamping means and the switching means, the three sets corresponding to video images of red, green and blue, respectively.

Thus, cutoff adjustment can be performed without equalizing the pedestal levels of the second vide signals, and only one holding means is sufficient to adjust the pedestal levels of the plurality of second video signals with the pedestal level of the first video signal held by the holding means.

According to another aspect of the present invention, a method for controlling a pedestal level includes the steps of selectively generating a first analog digital signal having a predetermined level based on a digital video data signal and a pedestal level adjustment data signal for adjusting a pedestal level of an analog video signal generated based on the video data signal, or an analog signal having a predetermined signal based on the pedestal level adjustment data signal, holding the predetermined pedestal level of the first analog video signal or the predetermined level of the analog signal, clamping a second analog video signal such that a pedestal level of the second analog video signal is equal to the predetermined pedestal level or the predetermined level that is held, and selectively switching between the first analog video signal and the clamped second analog video signal to output the signal.

The pedestal level is adjustable in brightness, for example, without using a clamp circuit, by generating a first analog video signal having a predetermined pedestal level in the step where signals are digital or in the step where the digital signals are D/A converted, as described above. Furthermore, the second analog video signal is clamped based on the pedestal level of the first analog video signal, therefore the pedestal level of the second analog video signal is adjustable without a control signal such as a pedestal level adjustment signal. Furthermore, when the analog signal having a predetermined level is selected, the analog signal becomes a signal having a constant level in accordance with the pedestal level adjustment data signal, so that even if the first and the second analog video signals are asynchronous, the pedestal level of the first analog video signal can be held and the second analog video signal can be clamped at a timing in accordance with the second video signal.

BRIEF DESCRIPTION OF THE DRAWINGS

FIG. 10 is a block diagram showing a configuration of a conventional brightness and cutoff adjustment circuit.

DETAILED DESCRIPTION OF THE INVENTION

Hereinafter, embodiments of the present invention will be described with reference to the accompanying drawings.

Embodiment 1

Figure 1:
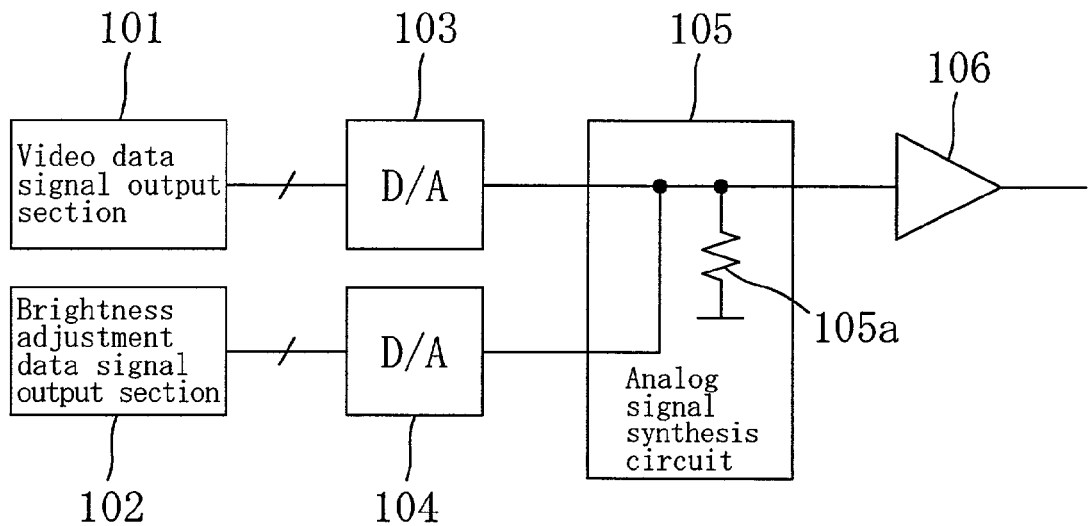
FIG. 1 is a block diagram showing a configuration of a brightness adjustment circuit of Embodiment 1.

FIG. 1 is a block diagram showing an entire configuration of a brightness adjustment circuit that is a single-channel pedestal level control circuit of Embodiment 1 of the present invention. As shown in FIG. 1, this brightness adjustment circuit includes a video data signal output section 101 (video data signal output means), a brightness adjustment data signal output section 102 (pedestal level adjustment data signal output means), D/A converters 103 and 104 (first D/A converter and second D/A converter), an analog signal synthesis circuit 105 (video signal generating means, analog signal synthesis means), and an amplifier 106. The video data signal output section 101 outputs video data signals that are digital signals. The brightness adjustment data signal output section 102 outputs brightness adjustment data signals that are digital signals indicating a brightness adjustment amount. The D/A converters 103 and 104 perform D/A conversion of the video data signal and the brightness adjustment data signal, respectively, and output a video signal and a brightness adjustment signal, respectively, that are currents (analog signals) having a magnitude corresponding to these data signals. The analog signal synthesis circuit 105 synthesizes the video signal and the brightness adjustment signal by adding the currents, converts it to a voltage with a resistor 105a and outputs the video signal (voltage) that is brightness adjusted. The amplifier 106 amplifies the video signal.

In the thus configured brightness adjustment circuit, the D/A converter 103 outputs a video signal whose pedestal level is in a predetermined reference level, based on the video data signal output from the video data signal output section 101. The D/A converter 104 outputs a brightness adjustment signal of a level corresponding to an offset amount from the pedestal level of the predetermined reference. Then, the video signal and the brightness adjustment signal are synthesized by the analog signal synthesis circuit 105, so that a video signal that is brightness adjusted is output from the amplifier 106, and thus a display apparatus such as a CRT or a LCD (liquid crystal display) is driven.

As described above, the video signal having the predetermined pedestal level that is generated by D/A conversion and brightness adjustment signal are synthesized, so that the video signal that is brightness adjusted can be obtained without the clamp circuit being provided. Therefore, the circuit scale can be reduced easily. Furthermore, the video signal and the brightness signal are synthesized in the step where they are output from the D/A converters 103 and 104, so that digital signals are separated from analog signals easily, and therefore they are hardly affected by noise. In addition, when brightness adjustment is performed to digital video data or in the step where the digital video data is D/A converted, other video adjustment processing (e.g., reproduction rate adjustment or black scale correction) that are required to be performed based on the uniform pedestal level between R, G and B can be performed collectively before outputting from the video data signal output section 101.

When converters utilizing current outputs as above are used as the D/A converters 103 and 104, signals can be synthesized comparatively easily. In addition, unlike converters utilizing voltage outputs, the signal synthesis is not restricted by the dynamic range between the power source and GND, so that the dynamic range of output signals can be enlarged easily (therefore, it is possible to increase the resolution of D/A (graduation) without limit). However, the present invention is not limited to the converters utilizing current outputs, and also when converters utilizing voltage outputs are used, the advantages of the present invention as described above can be obtained.

The video signal and the brightness adjustment signal can be synthesized on the output side of the amplifier 106.

The video data signal output section 101 and the brightness adjustment data signal output section 102 are not necessarily provided as separate circuits, and for example, it can be configured such that video signals and brightness adjustment data signals can be output by one microcomputer circuit.

Figure 2:
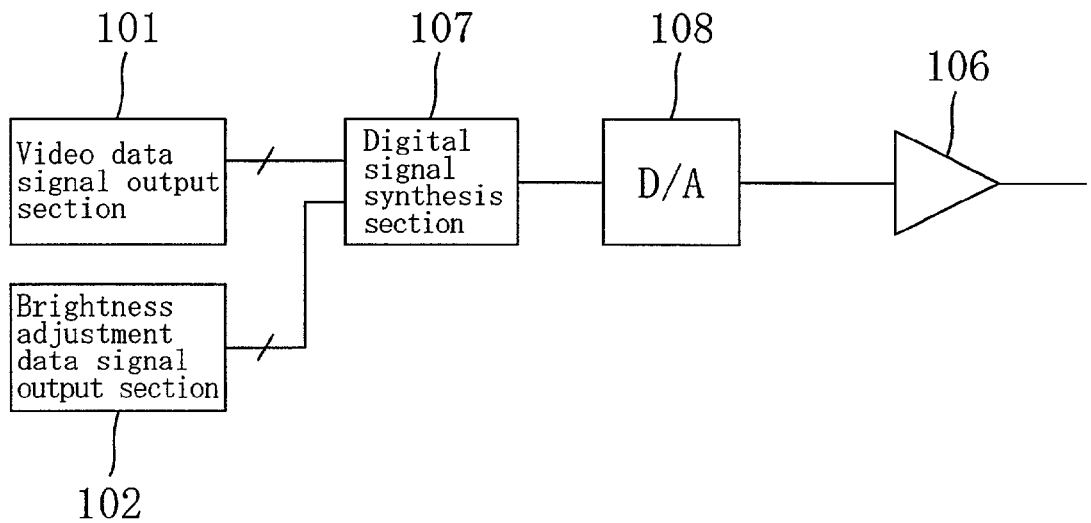
FIG. 2 is a block diagram showing a configuration of a variation of the brightness adjustment circuit of Embodiment 1.

Instead of the analog signal synthesis circuit 105, for example, as shown in FIG. 2, the digital signal synthesis section 107 (digital signal synthesis means) can be provided to synthesize the video data signal and the brightness adjustment data signal in the step where signals are digital. In this case, it is sufficient to provide one D/A converter 108 (D/A converting means) that is the same as the D/A converter 103 or 104. The digital signal synthesis section 107 can be configured with a dedicated circuit or can be configured with, for example, the processing function of a microcomputer. The video data signal output section 101 and the brightness adjustment data signal output section 102 also can be configured with the processing function of a microcomputer in combination therewith.

It is desirable to provide a latch on the output side of the brightness adjustment data signal output section 102 or input only one sampling pulse during one frame period or the like so that the amount of brightness adjustment is changed at a timing outside the video display period such as a vertical retrace period. However, the present invention is not limited thereto, as long as the above-described advantages can be obtained.

Embodiment 2

An example of a brightness and cutoff adjustment circuit for performing brightness adjustment and cutoff adjustment with respect to three channel video signals of R, G and B will be described with reference to FIG. 3. The elements having the same function as those in Embodiment 1bear the same reference numerals, and will not be described further.

Figure 3:
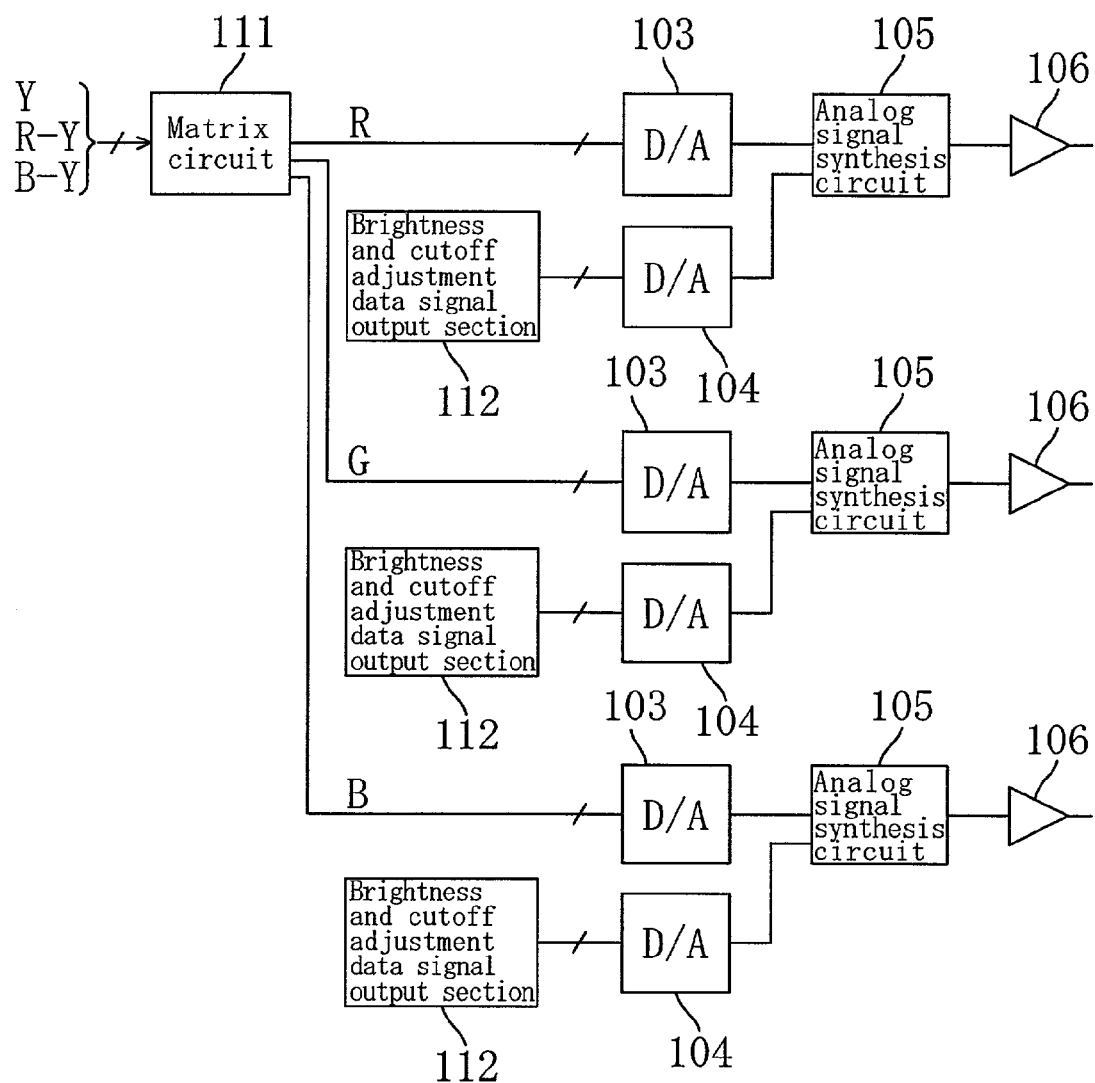
FIG. 3 is a block diagram showing a configuration of a brightness and cutoff adjustment circuit of Embodiment 2.

In FIG. 3, a matrix circuit 111 converts, for example, a digital luminance signal Y and color-difference signals R-Y and B-Y to video signals R, G and B of the three primary colors. The video signals R, G and B are input to the D/A converters 103 that are provided corresponding to each color. Brightness and cutoff adjustment data signal output sections 112 (pedestal level adjustment data signal output means) output brightness and cutoff adjustment data signals obtained by adding a cutoff adjustment amount for each color for adjusting white balance in accordance with non-uniformity in the emission of the CRT or the like to the brightness adjustment amounts that are equal among them. Other elements such as the D/A converters 103 and 104 that are the same as those in Embodiment 1 (FIG. 1) can be provided for each color.

Also in the thus configured brightness and cutoff adjustment circuit, the video signal having the predetermined pedestal level generated by the D/A converter and the brightness and cutoff adjustment signal are synthesized in the same manner as in the brightness adjustment circuit of Embodiment 1, so that video signals that are brightness adjusted and cutoff adjusted can be obtained without clamp circuits being provided.

As in Embodiment 1 (FIG. 2), the video data signal and the brightness and cutoff adjustment data signal are synthesized by the digital signal synthesis section 107 in the step where the signals are digital, and then the synthesized signal can be D/A converted by the D/A converter 108.

Embodiment 3

An example of a brightness adjustment circuit for brightness adjusting a video signal in response to a video signal that has been brightness adjusted in the manner, for example, as described in Embodiment 1 will be described. In this example, an internal video signal generated inside a device in which a brightness adjustment circuit is provided and an external video signal that is externally input are selectively switched. Such switching is used, for example, to display a receiving channel number or character information by partial superimposition on broadcast video images, or to switch between broadcast video images and other video images by unit of one or more frame periods for display.

Figure 4:
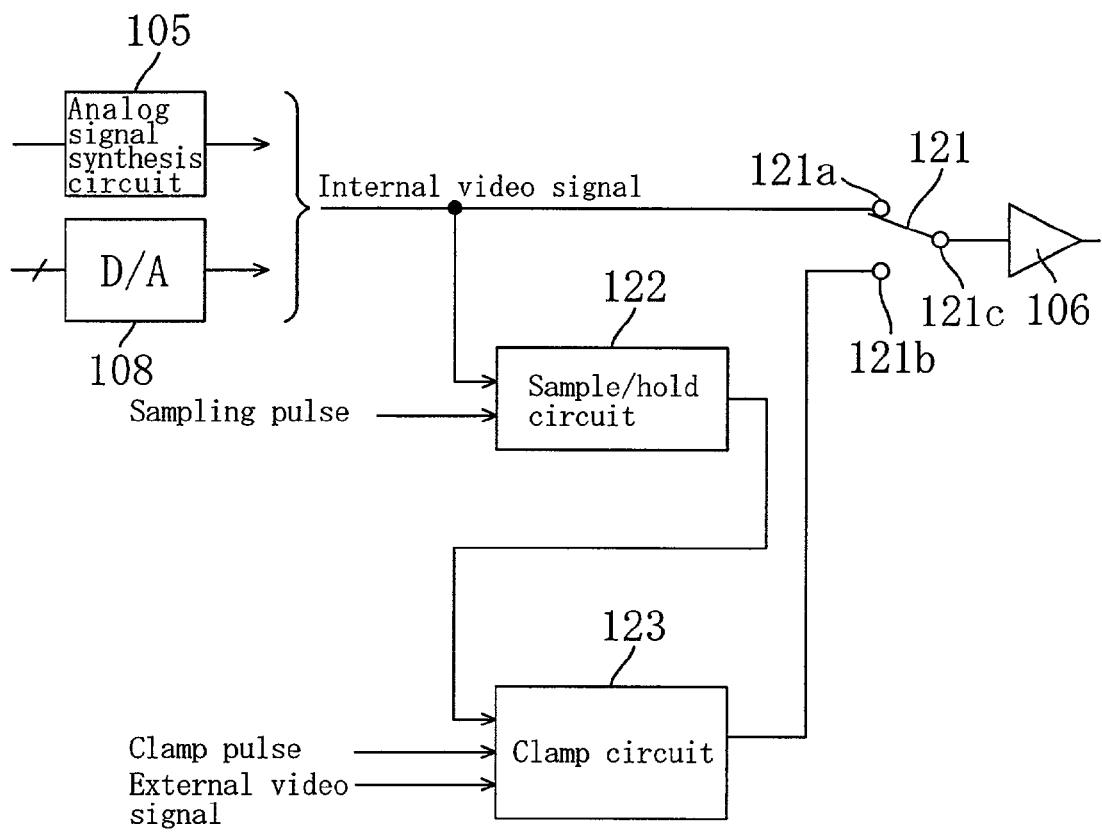
FIG. 4 is a block diagram showing a configuration of a brightness adjustment circuit of Embodiment 3.

As shown in FIG. 4, in this brightness adjustment circuit, a brightness adjusted video signal output from the analog signal synthesis circuit 105 or the D/A converter 108 of Embodiment 1 (FIGS. 1 and 2) is input as the internal video signal to one input terminal 121a of a switch 121 (switching means), and also is input to a sample/hold circuit 122 (holding means). The sample/hold circuit 122 holds a voltage of the pedestal level of the internal video signal, that is, the level corresponding to the brightness adjustment signal output from the D/A converter 104 at a timing in accordance with a sampling pulse in synchronization with the internal video signal. A clamp circuit 123 (clamping means) clamps the pedestal level of the external video signal in response to a clamp pulse, using the voltage held by the sample/hold circuit 122 as the reference voltage, and inputs it to an input terminal 121b of the switch 121. An output terminal 121c of the switch 121 is connected to the amplifier 106.

Figure 5:
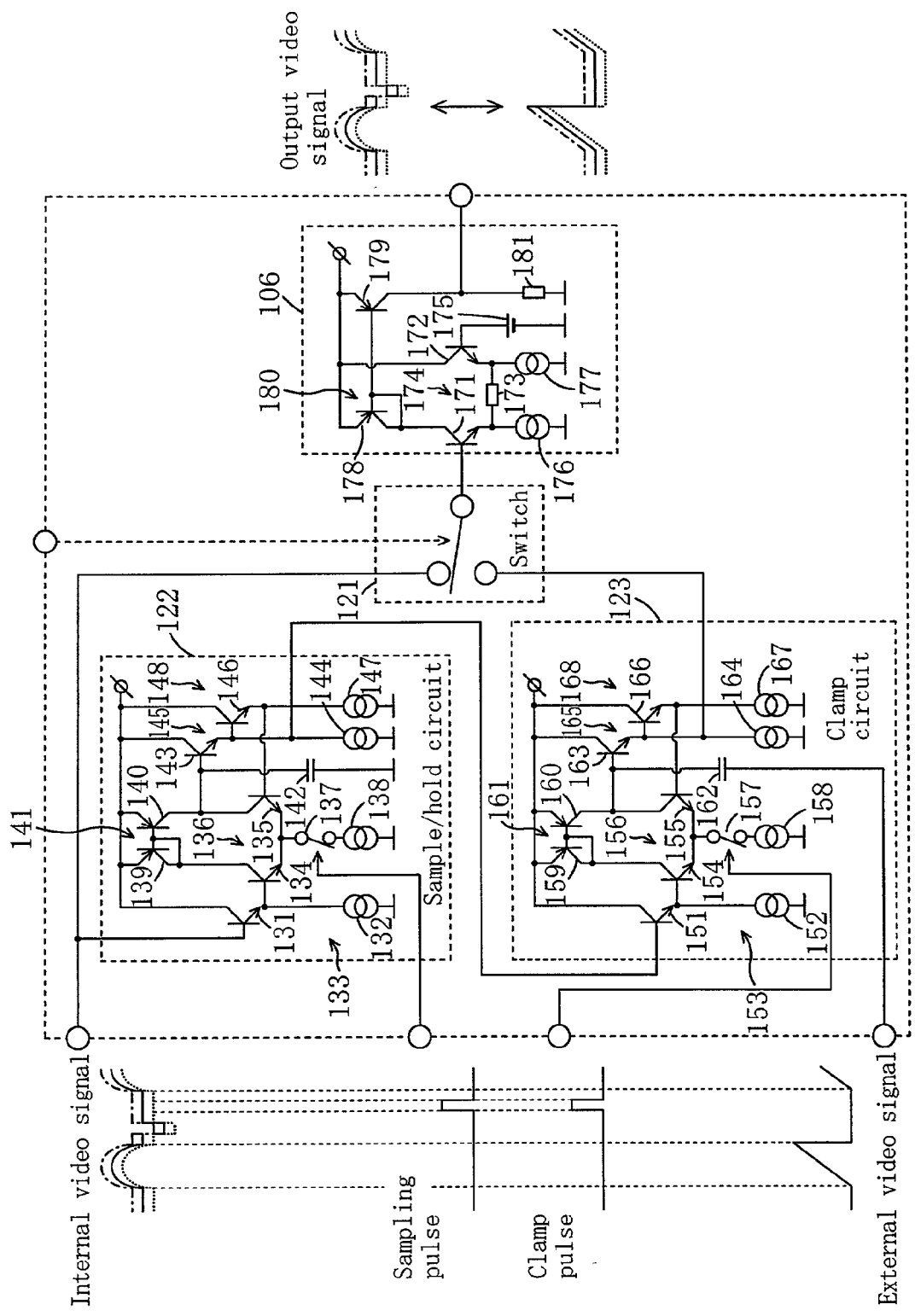
FIG. 5 is a circuit diagram showing a detailed configuration of each section of the brightness adjustment circuit of Embodiment 3.

The sample/hold circuit 122, the clamp circuit 123, and the amplifier 106 are configured, for example, as shown in FIG. 5 in greater detail. Referring to FIG. 5, the sample/hold circuit 122 includes a first emitter follower circuit 133, a differential switch 136, a sample/hold switch 137, a sample/hold current source 138, a first current mirror circuit 141, a capacitor 142, a second emitter follower circuit 145, and a third emitter follower 148. The first emitter follower circuit 133 includes a transistor 131 whose base receives an internal video signal and a power source 132. The differential switch 136 includes transistors 134 and 135 whose bases receive an output voltage (emitter voltage) from the first emitter follower circuit 133 and a feedback voltage, which will be described later, respectively, and the differential switch 136 compares the two voltages. The sample/hold switch 137 lets the differential switch 136 to be on at a timing when a sampling pulse of H level is input. The sample/hold current source 138 is connected between the sample/hold switch 137 and GND (ground). The first current mirror circuit 141 includes transistors 139 and 140, and performs mirroring with respect to collector currents of the two transistors. The capacitor 142 is connected to the ground at one terminal and holds a pedestal level (voltage) of the internal video signal set by charge and discharge by the collector currents of the transistors 135 and 140 in accordance with the difference in the base voltages of the transistors 134 and 135 while the sampling pulse is in L (Low) level. The second emitter follower circuit 145 includes a transistor 143 whose base receives a voltage held by the capacitor 142 and a power source 144. The third emitter follower 148 includes a transistor 146 whose base receives an output from the second emitter follower 145 and a power source 147 and feedbacks the output to a transistor 135 of the differential switch 136.

The clamp circuit 123 has a similar configuration to that of the sample/hold circuit 122. More specifically, the clamp circuit 123 includes a fourth emitter follower circuit 153 including a transistor 151 and a power source 152, a differential switch 156 including transistors 154 and 155, a clamp switch 157, a clamp power source 158, a second current mirror circuit 161 including transistors 159 and 160, a capacitor 162, a fifth emitter follower circuit 165 including a transistor 163 and a power source 164, and a sixth emitter follower 168 including a transistor 166 and a power source 167. However, the clamp circuit 123 is different from the sample/hold circuit 122 in the following points: An output from the second emitter follower circuit 145 of the sample/hold circuit 122 is input to the base of the transistor 151; the clamp switch 157 is configured so as to be on/off in response to a clamp pulse in synchronization with an external video signal; and an external video signal is input to one terminal of the capacitor 162. Thus, the pedestal level of the external video signal is clamped so as to be equal to the pedestal level of the internal video signal held in the sample/hold circuit 122.

An amplifier 106 includes a differential amplifier 174, a voltage source 175, current sources 176 and 177, a third current mirror circuit 180, and a load resistor 181. The differential amplifier 174 includes transistors 171 and 172, and a resistor 173, and converts a voltage signal that is a video signal selected by the switch 121 to a current signal. The voltage source 175 generates a voltage that is used as the reference for the conversion from a voltage to a current. The current sources 176 and 177 supply current to the differential amplifier 174. The third current mirror circuit 180 includes transistors 178 and 179 and performs mirroring with respect to the collector currents of the two transistors. The load resistor 181 converts the collector current of the transistor 179 to a voltage. Thus, an amplified output video signal is output.

In the thus configured brightness adjustment circuit, an internal video signal that is brightness adjusted in the manner, for example, as described in Embodiment 1 and a sampling pulse are input to the sample/hold circuit 122. The sampling pulse is similar to a general clamp pulse, and is a signal that turns into high at a timing of a back porch during a horizontal blanking in an internal video signal. The internal video signal level when the sampling pulse is in H (High) level, that is, the pedestal level is held by the sample/hold circuit 122, and signals of the same level are output while the sampling pulse is in L level.

The voltage that is held by the sample/hold circuit 122 and output is input to the clamp circuit 123 as the reference voltage. Thus, an external video signal input to the clamp circuit 123 is clamped so that the pedestal level thereof is equal to that of the internal video signal at a timing when a clamp pulse becomes high. In other words, when the pedestal level of the internal video signal is changed by brightness adjustment, the pedestal level of the external video signal is also changed in response to that change. Therefore, the basic luminance of video images to be displayed is always the same, regardless of the switching of the switch 121 to the external video signal or the internal video signal.

If the internal video signal and the external video signal are video signals in synchronization with each other, the sampling pulse and the clamp pulse are the same signal, so that either one of them can be input to the sample/hold circuit 122 and the clamp circuit 123.

Figure 6:
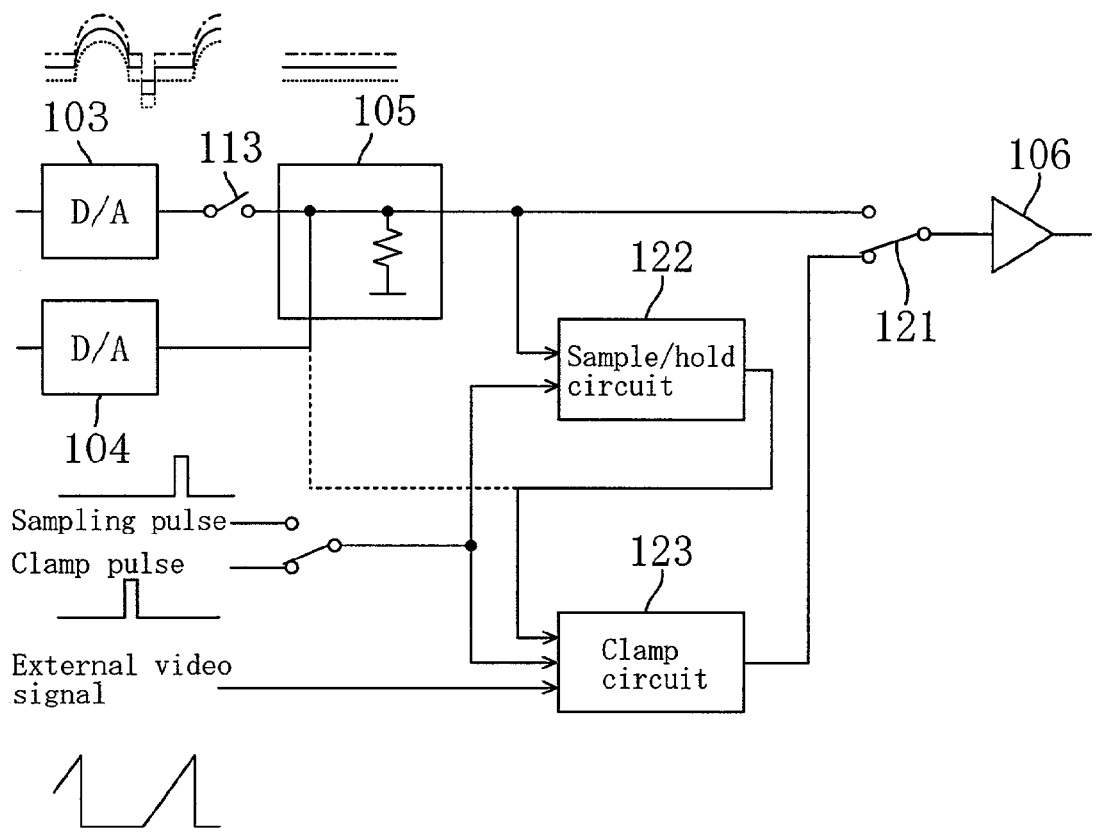
FIG. 6 is a block diagram showing a configuration of a variation of the brightness adjustment circuit of Embodiment 3.

Even if the internal video signal and the external video signal are not in synchronization with each other, either the sampling pulse or the clamp pulse that is in synchronization with either video signal of the internal video signal or the external video signal that is to be displayed (the sampling pulse in the case of the internal video signal, and the clamp pulse in the case of the external video) is input commonly to the sample/hold circuit 122 and the clamp circuit 123 in the following case: A switch 113 is provided at the output of the D/A converter 103, for example, as shown in FIG. 6; or the output current from the D/A converter 103 is zero when the external video signal is selected by the switch 121. In other words, in the case where the external video signal is selected by the switch 121 and only a voltage of a (constant) level in accordance with the brightness adjusted signal output from the D/A converter 104 is input to the sample/hold circuit 122, then a voltage that is constantly in the same level is held even if sampling is performed in any timings. Therefore, sampling by the sample/hold circuit 122 and clamping by the clamp circuit 123 can be performed simultaneously at a clamp pulse that is in synchronization with the external video signal.

Furthermore, it is possible to clamp the external video signal over a plurality of horizontal scanning periods or frame periods after sampling of the pedestal level of the internal video signal or the level in accordance with the brightness adjusted signal is performed, for example, in a first horizontal scanning period without performing sampling for every horizontal scanning period.

Furthermore, the sample/hold circuit 122 is not necessarily provided, and for example, as shown in broken lines in FIG. 6, outputs from the D/A converter 104 or the analog signal synthesis circuit 105 or the like can be input directly to the clamp circuit 123 as the reference voltage. In this case, the circuit scale can be reduced further by omitting the sample/hold circuit 122.

In the above example, an internal video signal and an external video signal are used as examples of brightness adjusted video signals and other video signals that are not brightness adjusted. However, the video signals are not limited thereto. Moreover, these video signals can be plural.

Embodiment 4

An example of a brightness and cutoff adjustment circuit for brightness adjusting and cutoff adjusting three channel video signals of R, G and B in the same manner as in Embodiment 2 and for brightness adjusting an external video signal in response to an internal video signal that is brightness adjusted in the same manner as in Embodiment 3 will be described.

Figure 7:
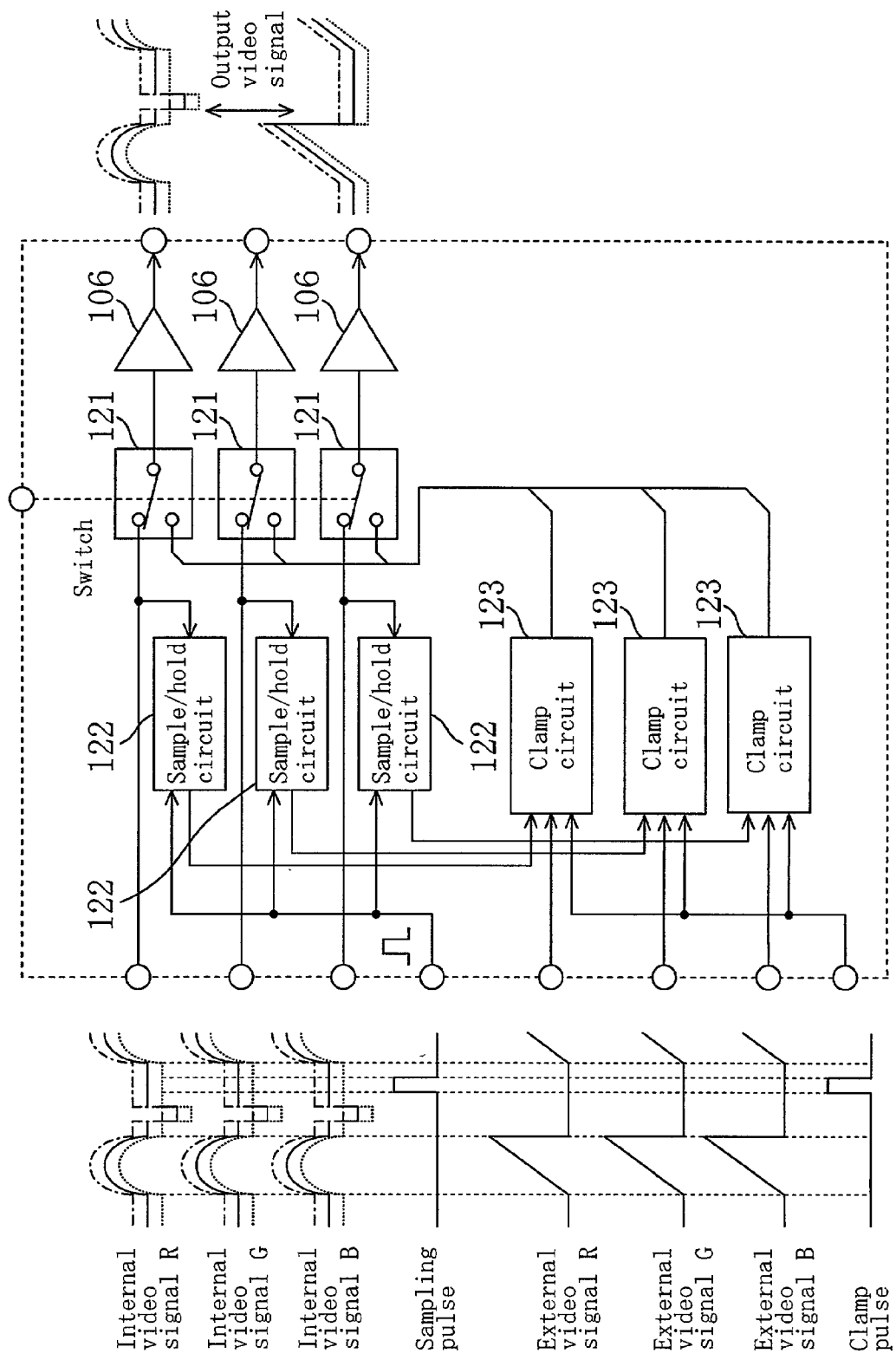
FIG. 7 is a block diagram showing a configuration of a brightness and cutoff adjustment circuit of Embodiment 4.

As shown in FIG. 7, this brightness and cutoff adjustment circuit includes the switches 121, the sample/hold circuits 122, the clamp circuits 123, and the amplifiers 106 that are the same as those in Embodiment 3 (FIG. 4). Each of them is provided corresponding to each color of R, G, and B. An internal video signal of R, G, and B that is brightness adjusted and cutoff adjusted in the manner, for example, as described in Embodiment 2 is input to each sample/hold circuit 122. An external video signal of R, G or B is input to each clamp circuit 123.

Also in this brightness and cutoff adjustment circuit, each section operates with respect to video signals of R, G, and B in the same manner as described in Embodiment 3, so that the pedestal level of the external video signal is set in response to the brightness adjustment and the cutoff adjustment of the internal video signal. As a result, the referential luminance is constantly the same between the internal video signal and the external video signal and suitable white balance can be obtained.

Figure 8:
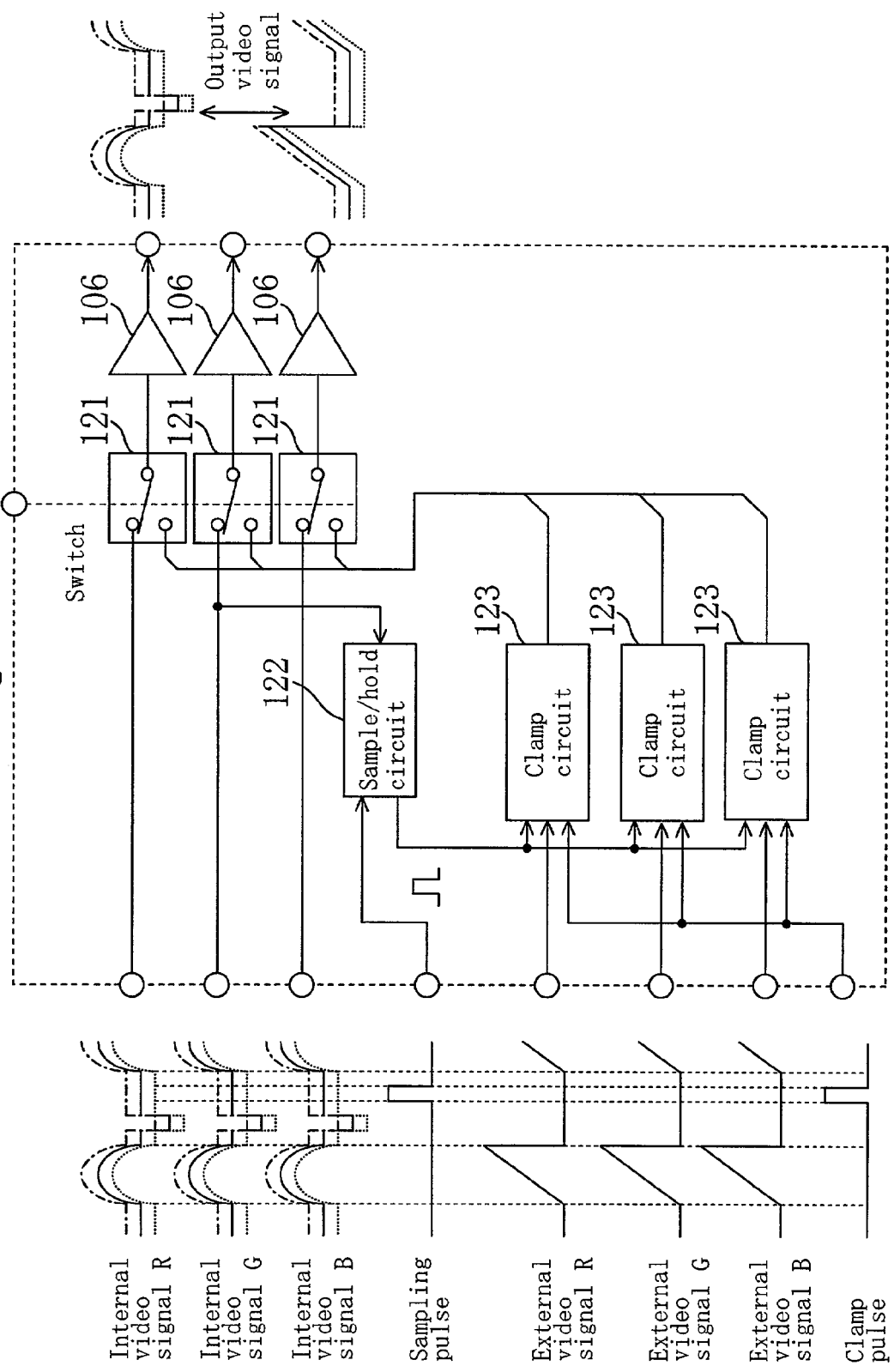
FIG. 8 is a block diagram showing a configuration of a variation of the brightness and cutoff adjustment circuit of Embodiment 4.
Figure 9:
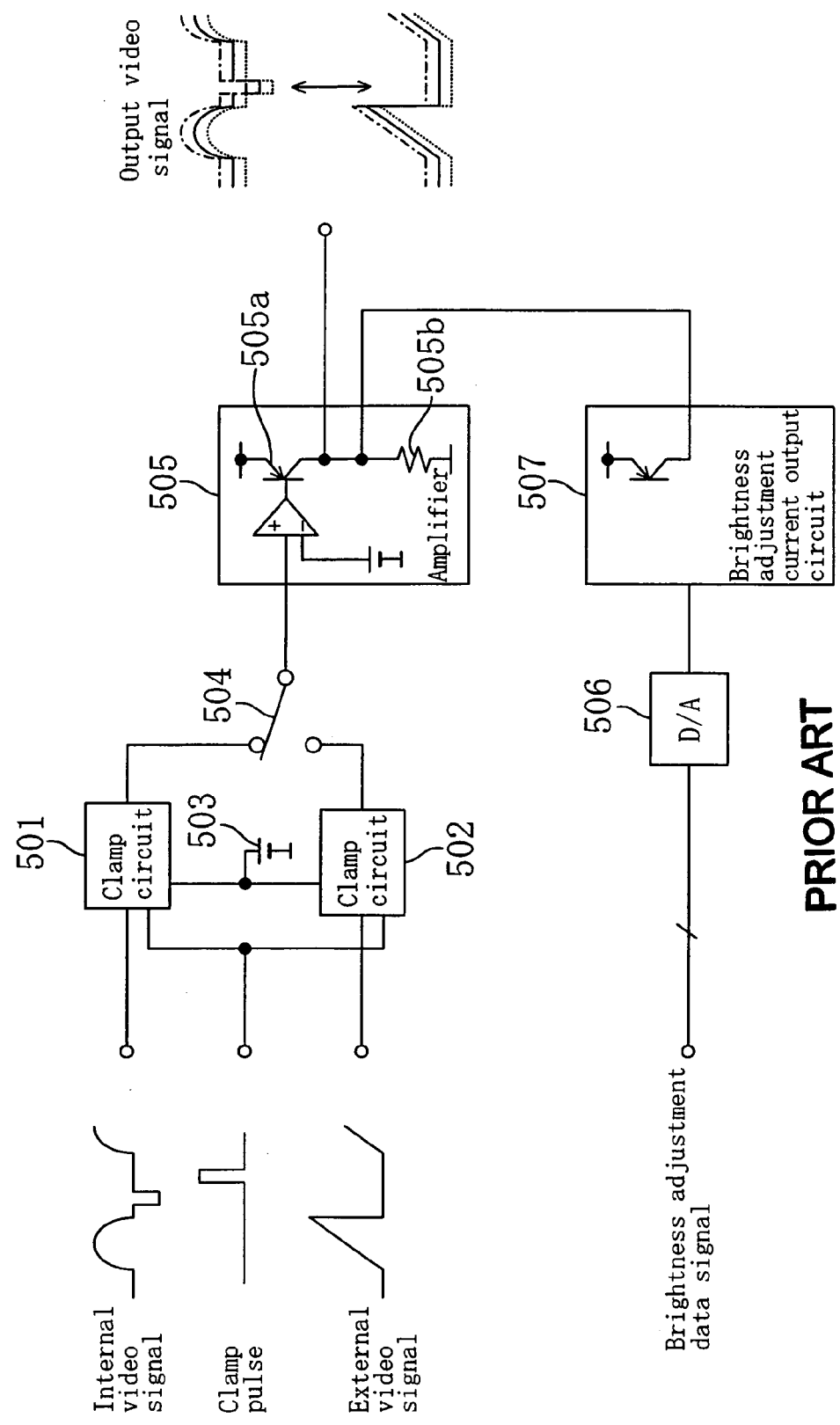
FIG. 9 is a block diagram showing a configuration of a conventional brightness adjustment circuit.

When the pedestal levels of the internal video signals for R, G and B are equal to one another, as shown in FIG. 8, only one sample/hold circuit 122 may be provided to which one of the R, the G, and the B internal video signals is input, and the voltage held by that sample/hold circuit 122 may be input as the reference voltage to the clamp circuits 123. In other words, with one video signal typifying the pedestal level, the pedestal level of other video signals can be adjusted with the typical video signal, so that the circuit scale can be suppressed to be small.

According to the present invention as described above, the pedestal levels are adjusted in the step where the video data is digital or the step where the video data is D/A converted, and there is no need to provide the clamp circuit. Therefore, the circuit scale can be reduced easily. Furthermore, an external video signal or the like can be clamped based on the pedestal level of a video signal whose brightness or the like has been adjusted without using a brightness adjustment signal or the like. Thus, the number of pins or lines of the IC chip can be reduced.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A pedestal level control circuit comprising:
   video data signal output means for outputting a digital video data signal;
   pedestal level adjustment data signal output means for outputting a pedestal level adjustment data signal used to generate an analog video signal having a predetermined pedestal level; and
   video signal generating means for generating the analog video signal having the predetermined pedestal level based on the video data signal and the pedestal level adjustment data signal,
   wherein a plurality of sets, each set including the video data signal output means, the pedestal level adjustment data signal output means and the video signal generating means, are provided,
   wherein three sets, each set including the video data signal output means, the pedestal level adjustment data signal output means and the video signal generating means, are provided, the three sets corresponding to video images of red, green and blue, respectively, and
   wherein the pedestal level adjustment data signal is a brightness and cutoff adjustment data signal for performing brightness adjustment commonly to the video images of the three colors and performing cutoff adjustment for video images independently for each color.

2. A pedestal level control circuit comprising:
   holding means for holding a predetermined pedestal level of a first video signal during a horizontal blanking in the first video signal;
   clamping means for clamping a second video signal such that a pedestal level of the second video signal is equal to the pedestal level of the first video signal that is held; and
   switching means for selectively switching between the first video signal and the clamped second video signal to output the signal.

3. The pedestal level control circuit according to claim 2, wherein the first video signal having a predetermined pedestal level is an analog video signal having a predetermined pedestal level that is generated based on a digital video data signal and a pedestal level adjustment data signal.

4. The pedestal level control circuit according to claim 3, further comprising a video signal generating means, wherein the video signal generating means outputs an analog signal based on the pedestal level adjustment data signal when the second video signal is selected.

5. The pedestal level control circuit according to claim 2, wherein a plurality of sets, each set including the holding means, the clamping means, and the switching means, are provided.

6. The pedestal level control circuit according to claim 5, wherein three sets, each set including the holding means, the clamping means, and the switching means, are provided, the three sets corresponding to video images of red, green and blue, respectively.

7. The pedestal level control circuit according to claim 2, wherein a plurality of sets, each set including the clamping means and the switching means, are provided, and the clamping means performs a clamping operation based on a pedestal level held by one holding means.

8. The pedestal level control circuit according to claim 7, wherein three sets, each set including the clamping means and the switching means, are provided, the three sets corresponding to video images of red, green and blue, respectively.

9. A method for controlling a pedestal level comprising the steps of:
   selectively generating a first analog video signal having a predetermined pedestal level based on a digital video data signal and a pedestal level adjustment data signal for adjusting a pedestal level of an analog video signal generated based on the video data signal, or an analog signal having a predetermined level based on the pedestal level adjustment data signal,
   holding the predetermined pedestal level of the first analog video signal or the predetermined level of the analog signal,
   clamping a second analog video signal such that a pedestal level of the second analog video signal is equal to the predetermined pedestal level or the predetermined level that is held, and
   selectively switching between the first analog video signal and the clamped second analog video signal to output the signal.

* * * * *